Patented Nov. 21, 1933

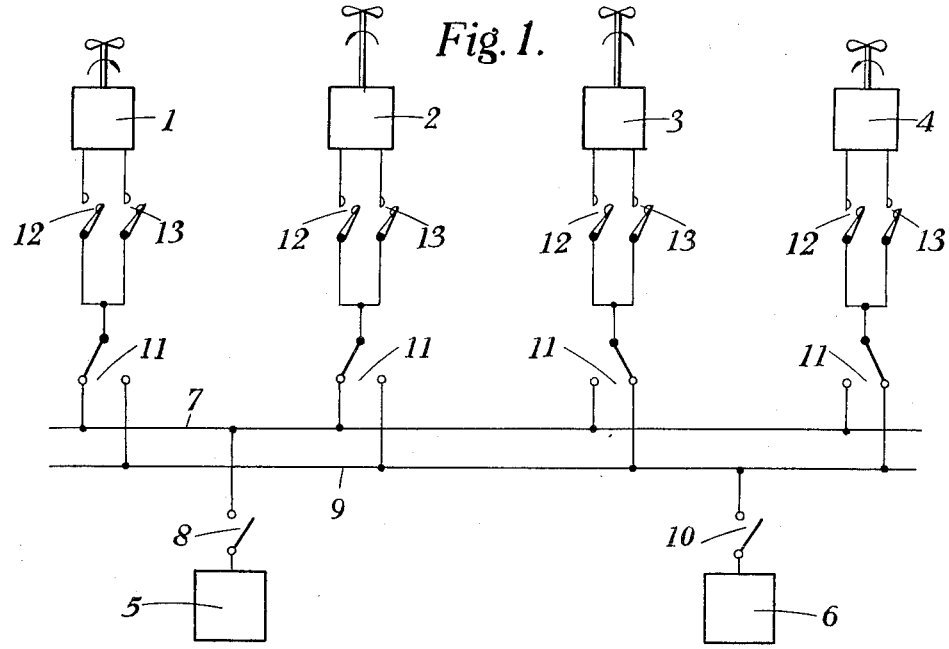
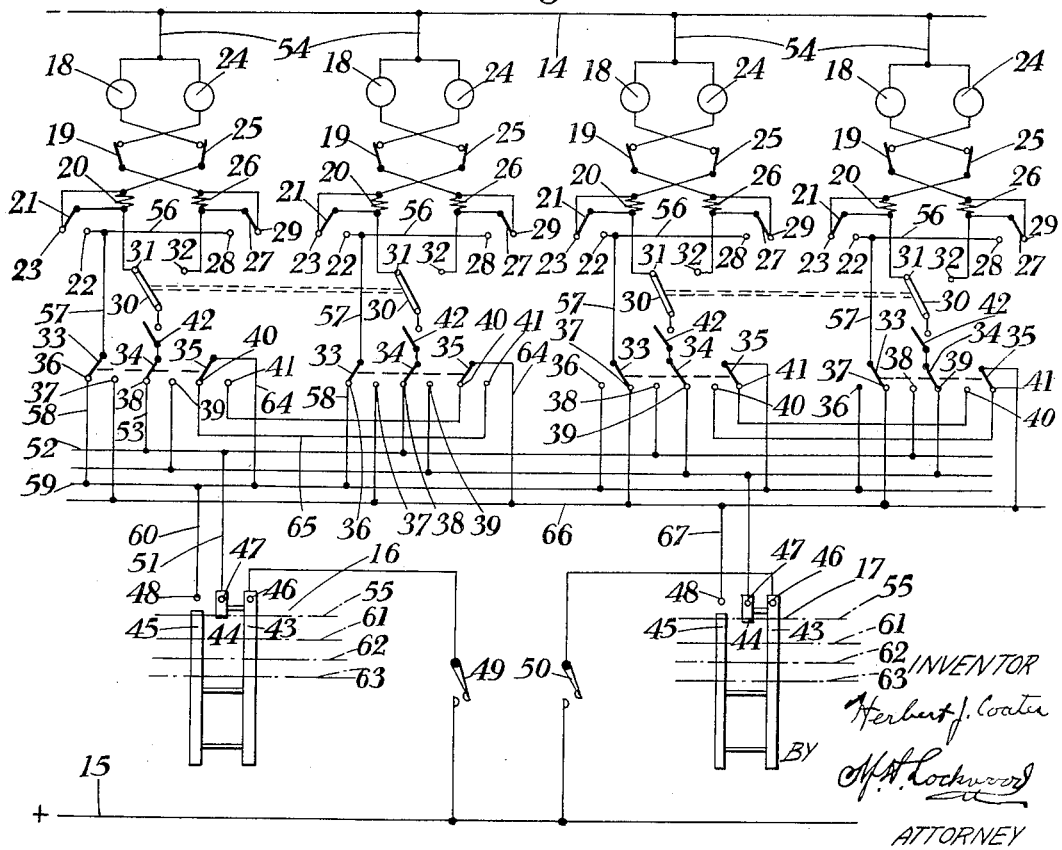

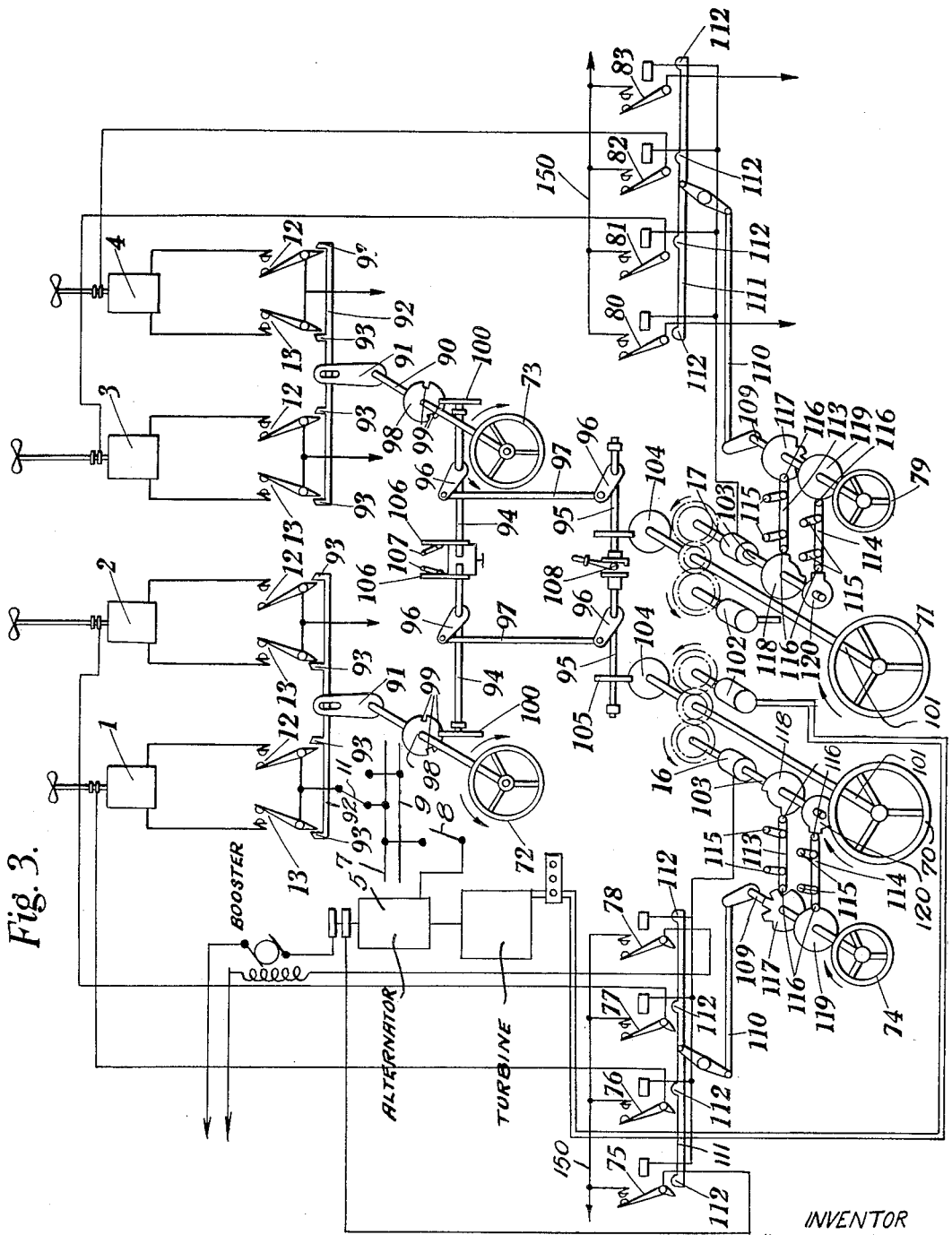

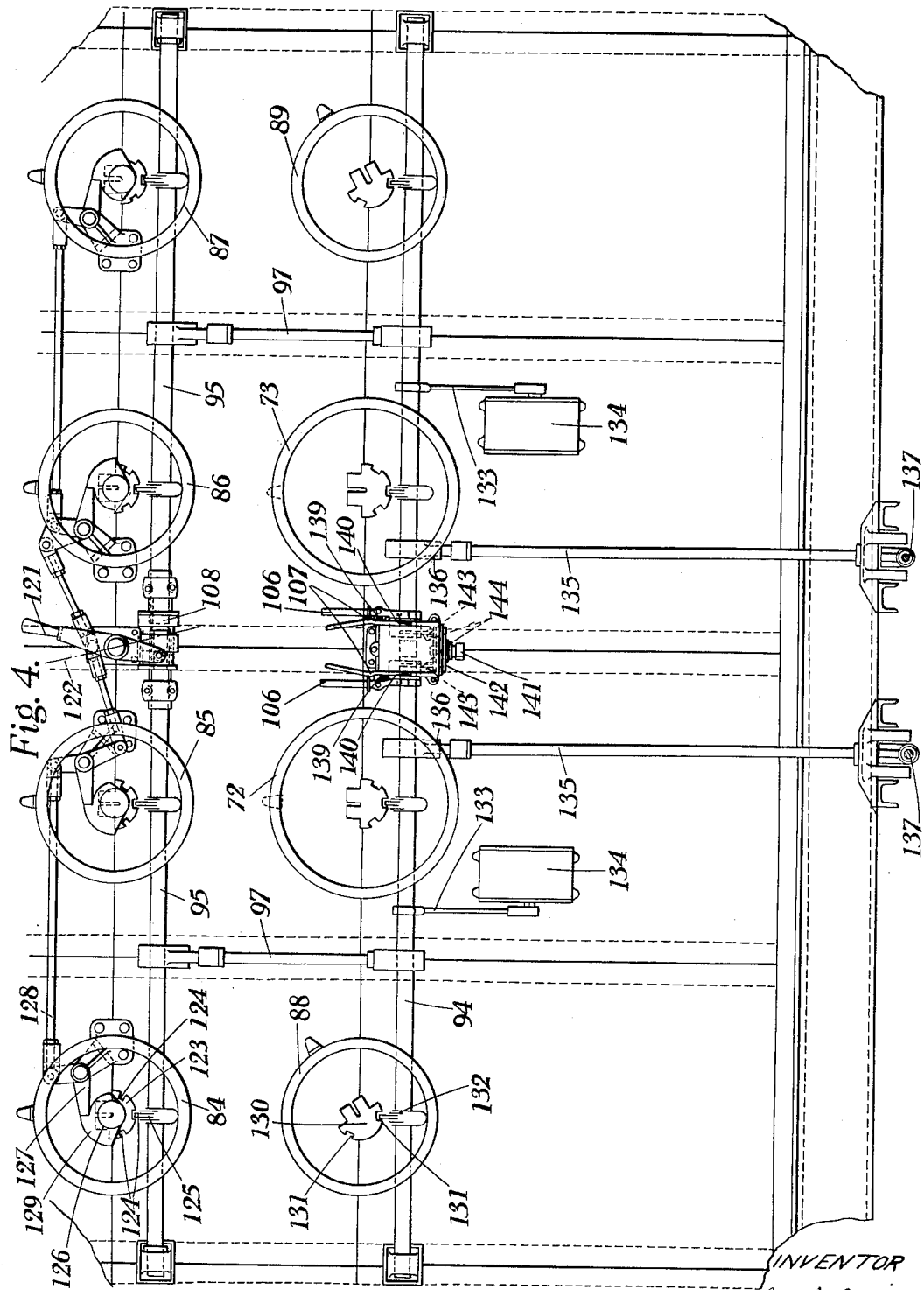

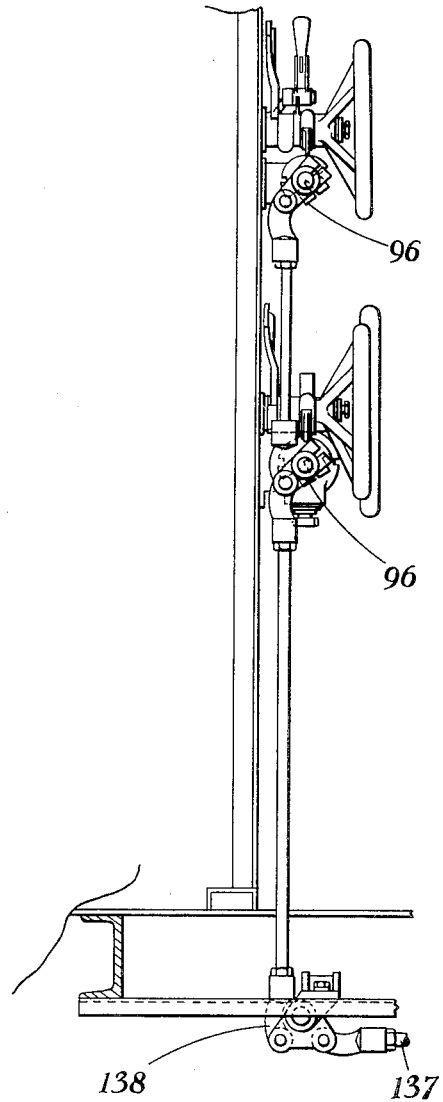

1,936,448

UNITED STATES PATENT OFFICE 1,936,448

ELECTRIC MOTOR CONTROL SYSTEM

Herbert John Coates, Birmingham, England, assignor to The General Electric Company Limited, London, England Application August 9, 1932, Serial No. 628,046, and in Great Britain August 21, 1931

3 Claims. (Cl. 172—8)

This invention relates to electric motor control systems suitable for use in connection with motors, for example, ship propulsion motors, the reliability and continuity of the control of which it is important should so far as is possible be ensured, one object being to provide an arrangement in which normally little effort is required on the part of the operator in effecting control, whilst at the same time danger of failure of the control system is largely if not wholly eliminated. Another object is the provision of a system of hand operated and mechanically interlocked switches for effecting control in connection with propulsion motors.

In an electric motor control system according to one feature of the present invention duplicate control means are provided and it is arranged for control switches to be operated mechanically or otherwise than mechanically and interlocking means are provided for preventing the operation of switches in wrong sequence mechanically or/and otherwise than mechanically.

According to another feature of the invention an electric motor control system comprises control means for controlling the operation in correct sequence of motor control switches operated other than mechanically and duplicate control means for operating motor control switches in correct sequence mechanically and interlocking means adapted to prevent incorrect operation and arranged to prevent or limit relative movements of the two control means.

An electric motor control system according to another feature of the invention comprises control means for controlling alternator and synchronous motor field control switches other than mechanically and for controlling the alternator speed, duplicate control means for operating alternator and motor field control switches mechanically and means interlocking the two control means to ensure correct operation thereof.

According to a further feature of the invention as applied to an electric ship propulsion system, motors adapted respectively to drive port and starboard propellers may be controlled through the same controller or through different controllers by means of mechanically operated switches, and mechanical interlocking means are provided to prevent reversal of a motor unless the controller with which the motor is at the time being associated is in a predetermined or "off" position.

Thus in one arrangement motors adapted respectively to drive port and starboard propellers may be controlled through the same controller or through different controllers by means of mechanically operated switches and mechanical interlocking means are provided between a direction control switch of one motor and the one controller to prevent reversal of the motor unless the controller is in a predetermined or "off" position and similarly interlocking means are provided between a direction control switch of the other motor and the other controller, and before a selector switch can be set to associate one motor with the particular controller with which the other motor is associated a clutch device must be moved to interconnect the interlocking means whereby the said means are both interlocked with the particular controller, and operation of the selector switch locks the clutch in the coupling position.

Actually selector switches are provided which determine with which controller each motor shall be associated, whilst mechanical interlocking means are provided between each selector switch and one of the controllers to prevent operation of the selector switch unless the controller is in a predetermined or "off" position, and before a selector switch interlocked with one controller can be moved to associate its motor with the other controller a clutch device must be moved which couples together the different interlocking means so that the said selector switch is then interlocked with the other controller, and movement of the selector switch to perform the selective operation locks the clutch in the coupling position.

Furthermore the motors may be controlled by the same control means or by different control means through switches operated otherwise than mechanically and furthermore by the same duplicate control means or by different duplicate control means through mechanically operated switches, and interlocking means are provided to prevent reversal of a motor unless the control and duplicate control means with which the motor is at the time being associated are both in predetermined or "off" positions.

The invention will now be described, by way of example, with reference to the accompanying drawings, of which Figure 1 is a diagram of the main circuits of the propelling arrangements for a four screw vessel, the 3-phase connections being shown as single lines, Figure 2 is a diagram of electrical control circuits for the arrangement shown in Figure 1, Figure 3 shows diagrammatically a method of effecting the control of the arrangement shown in Figure 1 mechanically, Figure 4 shows in detail part of the apparatus shown in Figure 3 and Figure 5 is an end elevation of Figure 4.

With reference to Figure 1 the four propellers are driven respectively by four synchronous-induction motors, 1, 2, 3 and 4, each of which is adapted to receiver power from one or other of two alternators 5 and 6. The alternators are respectively driven by two steam turbines which are not shown in the drawings.

The alternator 5 is adapted to be connected to bus bars 7 by means of an isolating switch 8, whilst the alternator 6 is adapted to be connected to bus bars 9 by means of an isolating switch 10.

Each motor is provided with a two-way isolating switch 11, an "astern" direction contactor 12 and an "ahead" direction contactor 13. Each two-way switch 11 is adapted to connect the associated motor to either bus bars 7 or bus bars 9.

With reference to Figure 2 the control circuits are adapted to be energized by direct current bus bars 14 and 15 through a starboard master controller 16 and a port master controller 17, which are adapted respectively to control the speeds of the turbines driving the alternators 5 and 6.

Each "astern" direction contactor 12 is provided with an operating coil 18, normally closed auxiliary contacts 19, an economy resistance 20, normally open retaining contacts 21 and 22 and normally closed economy resistance short circuiting contacts 21 and 23. Similarly each "ahead" direction contactor is provided with an operating coil 24, normally closed auxiliary contacts 25, an economy resistance 26, normally open retaining contacts 27 and 28 and normally closed economy resistance short circuiting contacts 27 and 29. The direction contactors of each motor are controlled by a direction control switch 30, the moving contact of which must make contact with either an "astern" contact 31 or an "ahead" contact 32. The two switches 30 of the star-board motors 1 and 2 are mechanically coupled together so that the star-board motors must be reversed together. Similarly the switches 30 of the port motors 3 and 4 are mechanically coupled together so that the port motors must be reversed together.

Each two-way isolating switch 11 is provided with three moving auxiliary contacts 33, 34 and 35 which are adapted to make contact respectively with contacts 36, 38 and 40 when the switch 11 is in the position for connecting the associated motors to bus bars 7, and with contacts 37, 39 and 41 when the switch 11 is in the position for connecting the associated motors to bus bars 9. Each moving contact 34 is adapted to be connected to the moving contact of the switch 30 by means of a control switch 42.

The controllers 16 and 17 are of the drum type and only those electrical connections which are necessary for an understanding of the invention are shown in the drawings. Other electrical connections are provided for controlling the motor, alternator and alternator booster fields during the starting up of the motors and turbines. The motors may be started up in any suitable manner. The starting up of the turbines is effected by movement of the controllers, each controller being adapted to control the speed of the associated turbine. In the drawings each controller is shown with three segments 43, 44 and 45, which are electrically connected together and which are adapted to make contact respectively with contacts 46, 47 and 48. The contacts 46 of the controllers 16 and 17 are adapted to be connected to the bus bar 15 through master control contactors 49 and 50 respectively. The controllers 16 and 17 are shown in the off position.

Referring again to Figure 1 it will be seen that any motor may be connected to either alternator, but that the alternators cannot be run in parallel. Thus, when cruising, the two outer motors 1 and 4 can be connected to one alternator and the two inner motors 2 and 3 can be connected to the other alternator. This enables the speeds of the outer and inner propellers to be controlled independently and the propellers to be set to run at their most efficient speeds. When manœuvring the two starboard motors 1 and 2 can be connected to one alternator and the two port motors 3 and 4 can be connected to the other alternator, thereby enabling the port and starboard motors to be controlled independently. Furthermore one alternator can be shut down and all four motors run off the other alternator. The isolating switches 8, 10 and 11 are all so interlocked that they can only be operated when the controllers are both in the off position.

In order to start up, the isolating switches and direction control switches are first set to the desired positions. Thus suppose it is desired to move ahead with the port and starboard motors independently controlled, then the two-way isolating switches 11 are closed so as to connect motors 1 and 2 to bus bars 7 and motors 3 and 4 to bus bars 9 and the alternator isolating switches 8 and 10 are closed. The four switches 42 and the master control contactors 49 and 50 are closed and the direction switches 30 moved to the "ahead" positions. The following circuit is then completed. Bus bar 15, contactor 49, contact 46 of controller 16, segments 43 and 44 of controller 16, contact 47 of controller 16, conductors 51, and 52, conductors 53 of motors 1 and 2, contacts 38 and 34 of motors 1 and 2, switches 42 and 30 of motors 1 and 2, contacts 32, 27, 29 and 19 of motors 1 and 2, operating coils 24 of contactors 13 of motors 1 and 2, conductors 54 of motors 1 and 2, bus bar 14. Similar circuits are also completed through the master control contactor 50, controller 17 and the circuits of motors 3 and 4. The four "ahead" direction contactors 13 are therefore closed and the motors are ready to start up in the "ahead" direction.

Both controllers 16 and 17 are now operated until when they have moved to the positions indicated by the lines 55, which correspond to a turbine speed of, say, 1/30 full speed, retaining circuits for the contactors 13 are completed and may be traced for motors 1 and 2 as follows:—
Operating coil 24, contact 19, economy resistance 26, contacts 27 and 28, conductors 56 and 57, contacts 33 and 36, conductors 58 and 60, contact 48 of controller 16, segments 45 and 43 of controller 16, contact 46 of controller 16, contactor 49, bus bar 15. Similar circuits may be traced for motors 3 and 4.

When the controllers have moved to the positions indicated by the lines 61, which correspond to a turbine speed of, say ⅕ full speed, the alternators are excited, double excitation being applied to the alternator fields, by closure of contacts (not shown) on the controllers, and the motors are run up as induction motors to approximately ⅕ speed. A sequence catch (not shown) prevents further movement of the controllers until the motors are up to speed.

When the controllers have moved to the positions indicated by the lines 62, the motor fields are excited, by closure of contacts (not shown) on the controllers, and the motors pulled into synchronism, whilst a second sequence catch (not shown) prevents further movement of the controllers until the motors are in synchronism.

When the controllers have moved to the positions indicated by the lines 63, which still correspond to a turbine speed of ⅕ full speed, excitation is applied to the fields of alternator boosters which reduce the excitation of the alternator fields to normal.

Automatic variable speed governors of the turbines now come into action and further movement of the controllers alters the variable speed governors for any speed between ⅕ and full speed.

During the return movement of the controllers the field circuits are retained, by retaining contacts (not shown) on the controllers, until the controllers have returned to the positions indicated by the lines 55, thereby enabling the speeds of the motors to be controlled to very low speeds when desired. Below ⅕ full speed the control is independent of the governors.

It will be seen that the contactors 13 of the motors 1 and 2 cannot be opened until segment 45 of controller 16 breaks contact with contact 48, and that the contactors 12 cannot be closed until the contactors 13 open, since the contacts 25 are open when the contactors 13 are closed. Thus the motors 1 and 2 cannot be reversed until the excitation has been removed from the fields of the motors 1 and 2 and of the alternator 5 and the speed of the alternator has been reduced to a very low value. Similarly the motors 3 and 4 cannot be reversed until the excitation has been removed from the fields of the motors 3 and 4 and of the alternator 6 and the speed of the alternator has been reduced to a very low value.

If at any time it is desired to remove a motor from service, the associated controller or the controllers are moved to the "off" position, the switch 42 of that motor opened and the controller or controllers moved to any desired position. Opening of the switch 42 effects opening of contactor 13 of the associated motor and prevents either contactor 12 or contactor 13 from closing.

From the description given above, the operation when the two outer motors 1 and 4 are connected to the alternator 5 and the two inner motors 2 and 3 are connected to the alternator 6 will be evident. But in this case, since one starboard motor is connected to one alternator and the other starboard motor is connected to the other alternator, it is necessary to prevent reversal of the starboard motors before both controllers 16 and 17 have been returned to the "off" position. It will be seen that this is the case since in addition to the direction contactor retaining circuit which has already been traced through controller 16 to bus bar 15, a circuit may be traced from conductor 59 as follows:— Conductor 59, conductor 64 of motor 1, contacts 35 and 40 of motor 1, conductor 65, contacts 41 and 35 of motor 2, conductor 64 of motor 2, conductors 66 and 67, contact 48 of controller 17, segments 45 and 43 of controller 17, contact 46 of controller 17, master control contactor 50, bus bar 15. Thus the retaining circuits of the starboard direction contactors are maintained until contacts 48 and segments 45 of both controllers 16 and 17 break contact with one another. Similarly the retaining circuits of the port direction contactors are maintained until contacts 48 and segments 45 of both controllers 16 and 17 break contact with one another.

Other combinations of motors and alternators will be evident and need not be further described.

In the arrangement described above the motors 1, 2, 3 and 4 are controlled electrically by the electrical operation of the control switches under the control of the controllers 16 and 17, but a duplicate control system by which the control of the motors may be effected mechanically by the mechanical or manual operation of the control switches in the event of failure of the electrical control will now be described with reference to Figures 3, 4 and 5.

The starboard and port controllers 16 and 17 are operated directly by starboard and port main control wheels 70 and 71 respectively (Figure 3). In addition a starboard emergency direction control hand wheel 72 is provided for effecting mechanical operation of the direction contactors 12 and 13 of the starboard motors 1 and 2; a port emergency direction control hand wheel 73 is provided for effecting mechanical operation of direction contactors 12 and 13 of the port motors 3 and 4; a starboard emergency field control hand wheel 74 is provided for effecting mechanical operation of the field contactor 75 of the starboard alternator 5, the field contactors 76 and 77 of the starboard motors 1 and 2 respectively and the field contactor 78 of the starboard alternator booster; a port emergency field control hand wheel 79 is provided for effecting mechanical operation of the field contactor 80 of the port alternator 6, the field contactors 81 and 82 of the port motors 3 and 4 respectively and the field contactor 83 of the port alternator booster; four hand wheels 84, 85, 86 and 87 (Figure 4) are provided for effecting mechanical operation of the four isolating switches 11 respectively; two hand wheels 88 and 89 are provided for effecting mechanical operation of the alternator isolating switches 8 and 10 respectively.

Each of the emergency direction control hand wheels 72 and 73 operates a shaft 90 which connects by means of a crank 91 through a pin and slot connection with a cam bar 92 and the hand wheel has a neutral position and astern and ahead positions. When the hand wheel is in the neutral position it exerts no influence through its cam bar 92 on the associated direction contactors 12 and 13, but when the starboard emergency direction control hand wheel 72 is moved in an anticlockwise direction to the astern or in a clockwise direction to the ahead position, cams 93 on the cam bar 92 acting through complementary parts on the starboard direction contactors 12 and 13, effect operation of the starboard astern or ahead direction contactors 12 and 13 respectively. The port emergency direction control hand wheel 73 effects control of the port direction contactors 12 and 13 in a similar manner.

The starboard emergency direction control hand wheel 72 is interlocked with the starboard controller 16 so that the said direction control hand wheel cannot be moved unless the controller hand wheel 70 is in the off position. This is effected by rotatable lever and clutch shafts 94 and 95 respectively disposed parallel to one another and interconnected by cranks 96 and a link 97 so that they must turn together and by notched discs and co-operating segments. One notched disc 98 is rigidly mounted on the shaft 90 of the emergency direction control hand wheel and has in its periphery three notches 99 corresponding to the three positions of the handwheel and normally engaged in one of the recesses to prevent rotation of the wheel is a segment 100 mounted on the lever shaft 94. Each of the controller hand wheels 70 and 71 operates a shaft 101 geared to an oil valve 102 for controlling the turbine speed and to a spindle 103 which carries the drum controller, and on the shaft 101 is a disc 104 with a single peripheral notch whilst on the clutch shaft 95 is a notched segment 105. The sides of the notch in the segment 105 embrace the said disc 104 and unless the latter is in the off position engagement of the sides of the notch in the segment 105 with the sides of the disc 104 prevents rotation of the clutch shaft 95 and therefore of the emergency direction control hand wheel. When, however, the disc 104 is in the off position the segment 105 is able to enter the notch in the disc 104 and the starboard direction contactors 12 and 13 may be mechanically operated by operating the lever shaft 94 until the segment thereon disengages a notch 99 of the disc 98 on the shaft 90 of the emergency direction control hand wheel and by then moving that wheel to the desired position. The lever shaft 94 is rotated by means of a lever 106 mounted on one end thereof and provided with a spring catch device 107 for maintaining the lever 106 in a normal position.

Similar interlocking means are arranged between the port emergency direction control hand wheel 73 and the port controller hand wheel 71 and the two lever shafts 94 are disposed in alignment and adjacently with the operating levers 106 at their inner ends. The clutch shafts 95 are also disposed in alignment and adjacent one another and between the shafts is a lever operated clutch 108, whereby the shafts 95 may be positively connected together. Further interlocking means described hereinafter are directly associated with the lever and clutch shafts.

If when the mechanical control is being used it is desired to isolate a motor this is accomplished by opening its isolating switch 11, whereby closure of a direction contactor 12 or 13 of the motor is of no effect.

The starboard emergency field control hand wheel 74 is coupled through a spindle 109 and linkage gear 110 to a sliding cam bar 111 associated with the field contactors 75, 76, 77 and 78 of the starboard alternator and booster and motors, it being arranged that when the hand wheel is rotated in a clockwise direction from its off position cams 112 on the bar 111 co-operating with complementary parts on the contactors, which are set in a row, close first the alternator field contactor 75, then simultaneously the two motor field contactors 76 and 77 and lastly the booster field contactor 78 to energize the respective fields, by connecting them to a direct current bus bar 150.

It could be arranged for the emergency field control hand wheel to operate four motor field contactors, auxiliary contacts on the motor isolating and selector switches rendering operative only the field contactors of the motors controlled at the time by the starboard control means.

The emergency field control hand wheel 74 is fitted with sequence catches similarly to those which operate on the controller hand wheel when the latter is turned in a clockwise direction from its off position, one catch arresting movement immediately after closing of the alternator field contactor 75 and before closure of the motor field contactors 76 and 77 and another catch arresting movement after closure of the motor field contactors 76 and 77 and before closing of the booster field contactor 78.

Two rocking bars 113 and 114 and sets of disc interlocks are arranged between the spindles 103 and 109 in order to ensure that the emergency field control hand wheel 74 can be turned from the off position only after the controller hand wheel 70 has been turned to a position which would normally result in closing electrically of the alternator field contactor 75 and before the controller handwheel has been moved past the position in which it would normally have effected eletrically the closing of the booster field contactor 78; and in order to ensure that the controller hand wheel 70 cannot be moved beyond the booster field closing position, that is the fourth position, unless the emergency field control hand wheel 74 is in one of its four positions, namely the off position, or in one of the positions at which it effects closure of the alternator field contactor 75, the motor field contactors 76 and 77 or the booster field contactor 78; and in order to ensure that the controller hand wheel 70 cannot be moved backwards beyond the first or minimum running speed position until the emergency field control hand wheel 74 has been moved to the off position, whereby all fields must be de-energized before reversing or restarting is effected.

Each rocking bar is suspended by two links 115 from a stationary part of the apparatus and carries at each end a roller 116 which co-operates with the periphery of a disc, one disc being mounted on the spindle 103, the spindles being parallel to one another and the discs and bar being in alignment with the bar between the discs. In the case of one pair of discs the disc 117 on the spindle 109 is formed with four peripheral notches so positioned that when the wheel is in any one of its different positions and only then can the roller 116 on the end of the bar 113 enter a notch. The disc 118 on the spindle 103 is formed with a single relatively long peripheral notch into which the roller 116 on the end of the bar 113 can enter only when the hand wheel 70 is in its second, third or fourth position. The length of the bar is such that unless one end is in a notch of one disc the other end prevents or limits movement of the other disc. In the case of the other pair of discs disc 119 on the spindle 109 is formed with a single peripheral notch into which the roller 116 on the end of the bar 114 can enter only when the wheel 74 is in its off position and the disc 120 on the spindle 103 is formed with a single notch extending around nearly the whole of the periphery of the disc and into which the roller 116 on the end of the bar 114 can enter except when the wheel 70 is in its off or first positions. Again the bar is of such length that unless one end is in a notch of one disc the other end prevents or limits movement of the other disc.

The port emergency field control gear is arranged to operate and is interlocked in a similar manner.

From the above description it will be seen that when mechanical control is exerted and the port alternator 6 is supplying the port motors 3 and 4 and the starboard alternator 5 is supplying the starboard motors 1 and 2 the port and starboard controls and interlocks are independent, as when the control is effected electrically, but as in the case of electrical control so also with the mechanical control, when a port or starboard alternator supplies a starboard or port motor respectively the control gear is interlocked with that apparatus which is controlled thereby. This is effected by means of the clutch 108 and the interlocking means associated therewith.

The lever shafts 94, the clutch shafts 95 and the mechanism associated therewith are shown in greater detail in Figures 4 and 5. Furthermore the hand wheels 84, 85, 86 and 87 for operating the motor isolating switches 11 and the hand wheels 88 and 89 for operating the alternator isolating switches 8 and 10 respectively are shown in these figures.

The sliding clutch 108 for coupling the shafts 95 together is operated by a lever 121, shown in the position in which the shafts are uncoupled; to operate the clutch to couple the shafts 95 together the lever 121 is moved to the position represented by the centre line 122. Each of the hand wheels 84, 85, 86 and 87 operates a shaft which is provided with an interlocking disc 123 with three notches 124 corresponding to the connection of the associated motor to the starboard alternator 5, the isolation of the motor and the connection of the motor to the port alternator 6 and this disc co-operates with a segment 125 on a clutch shaft 95, the interlocking being accomplished in a manner similar to that described above in connection with the emergency direction control hand wheels 72 and 73. Furthermore, on each of the shafts operated by the hand wheels 84 to 87 is a cam 126 with which co-operates a bell crank lever 127 rotatably mounted on a fixed part of the gear and the bell crank levers 127 are coupled by linkwork 128 to the lever 121 for operating the clutch 108. When the lever is in the position shown in which the clutch shafts 95 are uncoupled the end of an arm of each bell crank lever 127 forms a stop which co-operates with a step in the associated cam 126 to prevent the associated motor isolating and selector switch 11 from being turned from the starboard selecting position further than the isolating position in the case of a switch 11 of a motor 1 or 2 or from being turned from the port selecting position further than the isolating position in the case of a switch 11 of a motor 3 or 4. If, however, the clutch lever is turned to the position shown by the centre line 122 in which the clutch shafts 95 are coupled together the end of the said arm is retracted and the starboard switch may be turned to the port selecting position and the port switches to the starboard selecting position, but such movement of a switch results in engagement between a part 129 of the cam 126 on the switch shaft and a side of the arm of the associated bell crank lever 127, whereby the clutch lever 121 is locked in the coupling position represented by the centre line 122 until the isolating and selector switch is returned from the said position.

Since when the clutch shafts 95 are coupled together the port and starboard controller hand wheels 70 and 71 and emergency field control hand wheels 74 and 79 must be in their off positions before a lever 106 can be operated to move the lever and clutch shafts 94 and 95 to the release positions no motor isolating and selector switch 11 can be closed to connect the motor to an alternator which is in service.

The alternator isolating switches 8 and 10 are also respectively interlocked with the starboard and port lever shafts 94, each of the hand wheels 88 and 89 operates a shaft on which is a disc 130 with two notches 131 corresponding to the open and closed positions of the switch and a co-operating segment 132 is provided on each lever shaft 94 for engaging the notches.

Furthermore, coupled to the starboard and port lever shafts 94 through levers 133 are interlocking switches 134 which effect opening of the starboard or port master control contactor 49 or 50 (Figure 2) respectively if the starboard or port lever shaft 94 is moved to the release position. This is an additional safeguard ensuring that excitation is removed from the alternator, motors and booster directly associated with the master control contactor before isolating or/and selector switches or direction contactors are operated, the excitation current being taken through the master control contactors.

In Figure 3 the clutch shafts 95 are shown diagrammatically as being interlocked with their respective main control hand wheels 70 and 71. But in Figures 4 and 5 the interlocking is effected by means of a link 135 coupled to a crank 136 secured to each shaft 94; each link is adapted to effect movement of a rod 137 through a bell crank lever 138, the rod 137 leading to the main control cubicle where it is interlocked with the shaft 101 so that it can only move when the associated hand wheel 70 or 71 is in the off position thus preventing movement of the shafts 94 to the release positions except when the associated controller is in the off position. This interlocking may be effected by arranging for movement of the rod 137 to be prevented by abutment of the rod against the disc 104 and providing the disc 104 with a hole through which the rod can pass only when the disc is in its off position.

As already stated each lever 106 is provided with a spring catch device 107. Each catch 107 engages either a notch 139 to retain the associated shaft 94 in its locking position or a notch 140 to retain the shaft in its release position.

Associated with the levers 106 is an interlock of the key type that prevents entrance to the high tension cubicle, within which the different switches and contactors are arranged, unless the levers 106 are both turned to the release position. In order to open the cubicle door it is necessary to obtain a key 141 which is normally retained within a casing 142 and can only be released therefrom by being rotated. Such rotation of the key 141 to release it rotates through gearing two slotted barrels 143. The slots in the barrels 143 are adapted to be engaged by discs 144 attached respectively to the shafts 94 so that when the shafts 94 are in their locking positions the barrels 143 cannot be rotated and therefore the key 141 cannot be removed. When, however the shafts 94 are rotated to their release positions slots in the discs 144 coincide with the barrels 143 and so allow the barrels to be rotated and the key released, but releasing the key 141 causes the barrels to be rotated to positions in which their slots are transverse to their normal positions and so the discs 144 cannot be rotated and the shafts 94 returned to their locking positions until the key 141 has been reinserted in the casing and the barrels 143 rotated to their normal positions. Since the shafts 94 can both be turned to their release positions only when the hand wheels 70, 71, 74 and 79 are in their off positions it is ensured that the key 141 can only be obtained when the controllers and field contactors are in their off positions and that they cannot be moved from their off positions until the key 141 is returned to the casing 142.

From the above description it will be understood that in the event of failure of contactors or switches to operate electrically the control may be effected mechanically. Furthermore the mechanical apparatus is interlocked itself and with the electrical control gear to prevent incorrect operation and enables a convenient and quick control similar to that afforded by the electrical control gear to be effected manually.

The invention may be applied to direct current systems as well as to alternating current systems and the speed control of the motors may be effected in any suitable manner.

I claim:—

1. An electric ship propulsion system comprising a port motor for driving a port propeller, a starboard motor for driving a starboard propeller, a controller arranged to be associated with one of said motors to control the speed thereof, mechanically operated switching means for controlling the direction of rotation of the one motor, mechanical interlocking means for preventing operation of said switching means to reverse the direction of rotation of the motor unless the controller is in a predetermined position, another controller also arranged to be associated with the one motor to control the speed thereof, a selector switch for associating the one motor with either of said controllers, coupling means for connecting said interlocking means with said other controller to prevent operation of said switching means unless said other controller is in a predetermined position and means for preventing operation of the selector switch to associate the one motor with said other controller before operation of the coupling means to connect the interlocking means with said other controller.

2. An electric ship propulsion system comprising motors arranged to drive port and starboard propellers respectively, two controllers arranged to be associated with the motors to control the speed thereof, selector switches for determining with which controller each motor shall be associated, mechanical interlocking means provided between each selector switch and one of the controllers to prevent operation of the selector switch unless the controller is in a predetermined position, means for coupling together the different interlocking means so that the selector switch is interlocked with the other controller, and means for preventing the movement of a selector switch to associate its motor with the other controller before the interlocking means have been coupled together.

3. An electric motor control system for ship propulsion comprising control switches, an electric controller controlling circuits for operating the control switches electrically in the correct sequence and for effecting speed control, means for operating said control switches manually, mechanical interlocking means for preventing manual operation of said control switches in the wrong sequence and mechanical interlocking means for preventing said manual operation of the control switches unless said electric controller is in a predetermined position.

HERBERT JOHN COATES.